United States Patent
Ramirez et al.

(10) Patent No.: US 11,272,656 B2
(45) Date of Patent: Mar. 15, 2022

(54) TELESCOPIC SHAFT SHIELDING WITH QUICK CONNECT ASSEMBLY

(71) Applicant: DEERE & COMPANY, Moline, IL (US)

(72) Inventors: Javier Jose Perez Ramirez, Pinto (ES); Thomas Rohlfing, Nevada, IA (US); Gregory S. McCunn, Orion, IL (US)

(73) Assignee: DEERE & COMPANY, Moline, IL (US)

( * ) Notice: Subject to any disclaimer, the term of this patent is extended or adjusted under 35 U.S.C. 154(b) by 334 days.

(21) Appl. No.: 16/389,192

(22) Filed: Apr. 19, 2019

(65) Prior Publication Data

US 2020/0329625 A1    Oct. 22, 2020

(51) Int. Cl.
*A01B 71/08*     (2006.01)
*F16D 3/84*      (2006.01)

(52) U.S. Cl.
CPC .............. *A01B 71/08* (2013.01); *F16D 3/841* (2013.01); *F16D 3/848* (2013.01); *Y10S 464/901* (2013.01); *Y10T 403/606* (2015.01)

(58) Field of Classification Search
CPC ......... A01B 71/08; F16D 3/841; F16D 3/848; Y10T 403/606; Y10S 464/901; F16H 57/0018; F16J 15/52; F16P 1/02
USPC ...................................................... 464/172
See application file for complete search history.

(56) References Cited

U.S. PATENT DOCUMENTS

| 2,919,562 | A |   | 1/1960  | Weasler |
| 3,111,821 | A |   | 11/1962 | Edwards et al. |
| 3,344,618 | A |   | 10/1967 | Young |
| 3,418,828 | A | * | 12/1968 | Le ............... F16D 3/848 464/172 |
| 4,125,000 | A | * | 11/1978 | Grob ............. F16D 3/848 403/109.1 |
| 4,627,826 | A |   | 12/1986 | Juziak et al. |
| 6,093,107 | A | * | 7/2000  | Merlo ............ F16C 3/03 403/109.1 |
| 2015/0316109 | A1 |   | 11/2015 | Burgess |
| 2016/0252139 | A1 | * | 9/2016 | Colombini ...... F16D 3/848 |

FOREIGN PATENT DOCUMENTS

GB          896120    *  5/1962  ................. 464/171

* cited by examiner

*Primary Examiner* — Greg Binda
(74) *Attorney, Agent, or Firm* — Taft Stettinius & Hollister LLP; Stephen F. Rost

(57) ABSTRACT

A shield assembly for a shaft includes a first tubular section having a first end and a second end and a second tubular section having a first end and a second end. The first and second tubular sections are each hollow receiving the shaft. The first tubular section includes a first outer diameter and the second tubular section includes a second outer diameter, the first outer diameter being greater than the second outer diameter. The first tubular section and the second tubular section are telescopically coupled to one another where the second tubular section is movably disposed at least partially within the first tubular section.

7 Claims, 7 Drawing Sheets

TELESCOPIC SHAFT SHIELDING WITH QUICK CONNECT ASSEMBLY

FIELD OF THE DISCLOSURE

The present disclosure relates to a shaft, and in particular, to an assembly for shielding the shaft of a work machine during operation.

BACKGROUND

Shafts are conventionally used to transfer power or torque from an input to an output. Often times, shafts are rotatably driven at significant rotational speeds. As such, it is often desired to include a cover or shield at least partially over the shaft to prevent debris and other contaminants from affecting the performance of the shaft. Moreover, the cover or shield offers protection to someone repairing the shaft or other parts located near the shaft.

In the present disclosure, one or more embodiments are presented for providing an improved shielding of one or more shafts on a work machine.

SUMMARY

In one embodiment of the present disclosure, a shield assembly for a shaft includes a first tubular section comprising a first body having a first end and a second end, the body defining a first hollow channel therethrough from the first end to the second end for receiving the shaft; and a second tubular section comprising a second body having a first end and a second, the body defining a second hollow channel therethrough from the first end to the second end for receiving the shaft; wherein, the first tubular section comprises a first outer diameter and the second tubular section comprises a second outer diameter, the first outer diameter being greater than the second outer diameter; further wherein, the first tubular section and the second tubular section are telescopically coupled to one another where the second tubular section is movably disposed at least partially within the first tubular section.

In one example of this embodiment, the first tubular section and the second tubular section are telescopically coupled to one another to form a collapsed configuration and an extended configuration, the collapsed configuration comprising a smallest length of the shield assembly and the extended configuration comprising a largest length of the shield assembly. In a second example, a shaft is disposed within the first and second hollow channels, the shaft comprising a shaft length; wherein, the first tubular section and second tubular section are adjustably and telescopically positioned relative to one another so that a length of the first and second tubular sections is approximately the same as the shaft length. In a third example, the first tubular section and second tubular section are removably coupled to one another.

In a fourth example, the first end of the first tubular section comprises a reduced diameter that is less than the second outer diameter. In a fifth example, a shield coupler is provided for coupling to the first tubular section, the shield coupler comprising a narrow portion including one or more tabs and a larger portion comprising one or more tabs; wherein, the first tubular section comprises one or more apertures formed therein for receiving the one or more tabs on the narrow portion of the shield coupler in a quick-connect manner. In a further example, a shield coupler is provided for coupling to the second tubular section, the shield coupler comprising a narrow portion including one or more tabs and a larger portion comprising one or tabs; wherein, the second tubular section comprises one or more apertures formed therein for receiving the one or more tabs on the narrow portion of the shield coupler in a quick-connect manner.

In another embodiment of the present disclosure, a shaft shielding assembly for a work machine having a frame includes a bracket configured to be coupled to the frame, the bracket comprising a shaft opening for receiving a shaft along a shaft axis, where the bracket further forms a plurality of slots each of which is radially spaced from one another relative to the shaft axis; a first shield coupler comprising a plurality of tabs protruding therefrom and including a retaining portion; a second shield coupler comprising a plurality of tabs protruding therefrom and including a retaining portion; wherein, the plurality of slots comprises a first set of slots and a second set of slots; wherein, the first shield coupler is coupled to the first set of slots in a quick-connect manner, and the second shield coupler is coupled to the second set of slots in a quick-connect manner.

In one example of this embodiment, each of the first set of slots and second set of slots are formed in an alternating manner about the shaft axis. In a second example, the first shield coupler defines a plurality of spaces between every pair of adjacent tabs of the plurality of tabs; the second shield coupler defines a plurality of spaces between every pair of adjacent tabs of the plurality of tabs; further wherein, when the first shield coupler and the second shield coupler are coupled to the bracket, each of the plurality of tabs of the first shield coupler are located within one of the plurality of spaces formed in the second shield coupler, and each of the plurality of tabs of the second shield coupler are located within one of the plurality of spaces formed in the first shield coupler.

In a third example, the first shield coupler and the second shield coupler comprise the same shape and design, the first shield coupler being rotationally offset relative to the second shield coupler when both the first and second shield couplers are coupled to the bracket. In a fourth example, at least one of the first shield coupler and the second shield comprises a first portion, a second portion, and a conical portion integrally formed between the first and second portions, where the first portion comprises a larger diameter than the second portion, and the plurality of tabs are integrally formed in the first portion. In a fifth example, the first shield coupler and second shield coupler comprise a plastic material formed by injection molding.

In another example of this embodiment, a first tubular section includes a first end and a second end, the first tubular section defining a first hollow channel therethrough from the first end to the second end for receiving the shaft; and a second tubular section includes a first end and a second, the second tubular section defining a second hollow channel therethrough from the first end to the second end for receiving the shaft; wherein, the first tubular section is coupled to the first shield coupler and the second tubular section is coupled to the second shield coupler.

In yet another example, the first shield coupler comprises one or more tabs and the first tubular section comprises one or more apertures; the second shield coupler comprises one or more tabs and the second tubular section comprises one or more apertures; further wherein, the one or more apertures formed in the first tubular section is configured to receive the one or more tabs of the first shield coupler in a quick-connect connection, and the one or more apertures formed in the second tubular section is configured to receive the one or more tabs of the second shield coupler in a quick-connect connection.

In a further embodiment of the present disclosure, a method of installing a shaft to a machine having a frame and a power-generating mechanism includes providing a first tubular section, a second tubular section, a first bracket, a second bracket, a first shield coupler, and a second shield coupler; forming a tubular assembly by telescopically coupling the first and second tubular sections to one another; inserting the shaft into the tubular assembly such that the shaft is at least partly surrounded by the first and second tubular sections; coupling the first shield coupler to the first bracket via a quick-connect connection, where the first bracket is mounted to the frame; coupling the second shield coupler to the second bracket via a quick-connect connection, where the second bracket is mounted to the frame spaced from the first bracket; coupling the tubular assembly to the first and second shield couplers via quick-connect connections; and installing the shaft to the work machine.

In one example of this embodiment, the coupling the tubular assembly step comprises adjusting a length of the tubular assembly by telescopically moving the first tubular section and second tubular section relative to one another until the length thereof is approximately the same as a distance defined between the first and second shield couplers. In a second example, the method may include aligning each of a plurality of tabs on the first shield cover with a corresponding one of a plurality of apertures formed in the first tubular section; moving the first tubular portion into contact with the first shield cover until each of the plurality of tabs on the first shield cover is located within the one of the plurality of corresponding apertures formed in the first tubular section; and coupling the first tubular section to the first shield cover.

In another example, the method may include aligning each of a plurality of tabs extending from the first shield cover with a corresponding one of a plurality of slots formed in the first bracket; moving the first shield cover into contact with the first bracket until each of the plurality of tabs on the first shield cover is disposed within the corresponding one of the plurality of slots; and coupling the first shield cover to the first bracket once the plurality of tabs are retained within the plurality of slots.

In a further example, the method may include providing a third shield cover comprising a plurality of tabs extending therefrom; aligning each of a plurality of tabs extending from the third shield cover with a corresponding one of a plurality of slots formed in the first bracket; positioning the third shield cover into contact with the first bracket until each of the plurality of tabs on the third shield cover is disposed within the corresponding one of the plurality of slots; coupling the third shield cover to the first bracket once the plurality of tabs are retained within the plurality of slots; wherein, the plurality of tabs of the first shield cover are retained within a first set of the plurality of slots formed in the first bracket and the plurality of tabs of the third shield cover are retained within a second set of the plurality of slots; wherein, each of the plurality of tabs of the first shield cover are located within a gap formed between two of the plurality of tabs of the third shield, and each of the plurality of tabs of the third shield cover are located within a gap formed between two of the plurality of tabs of the first shield.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
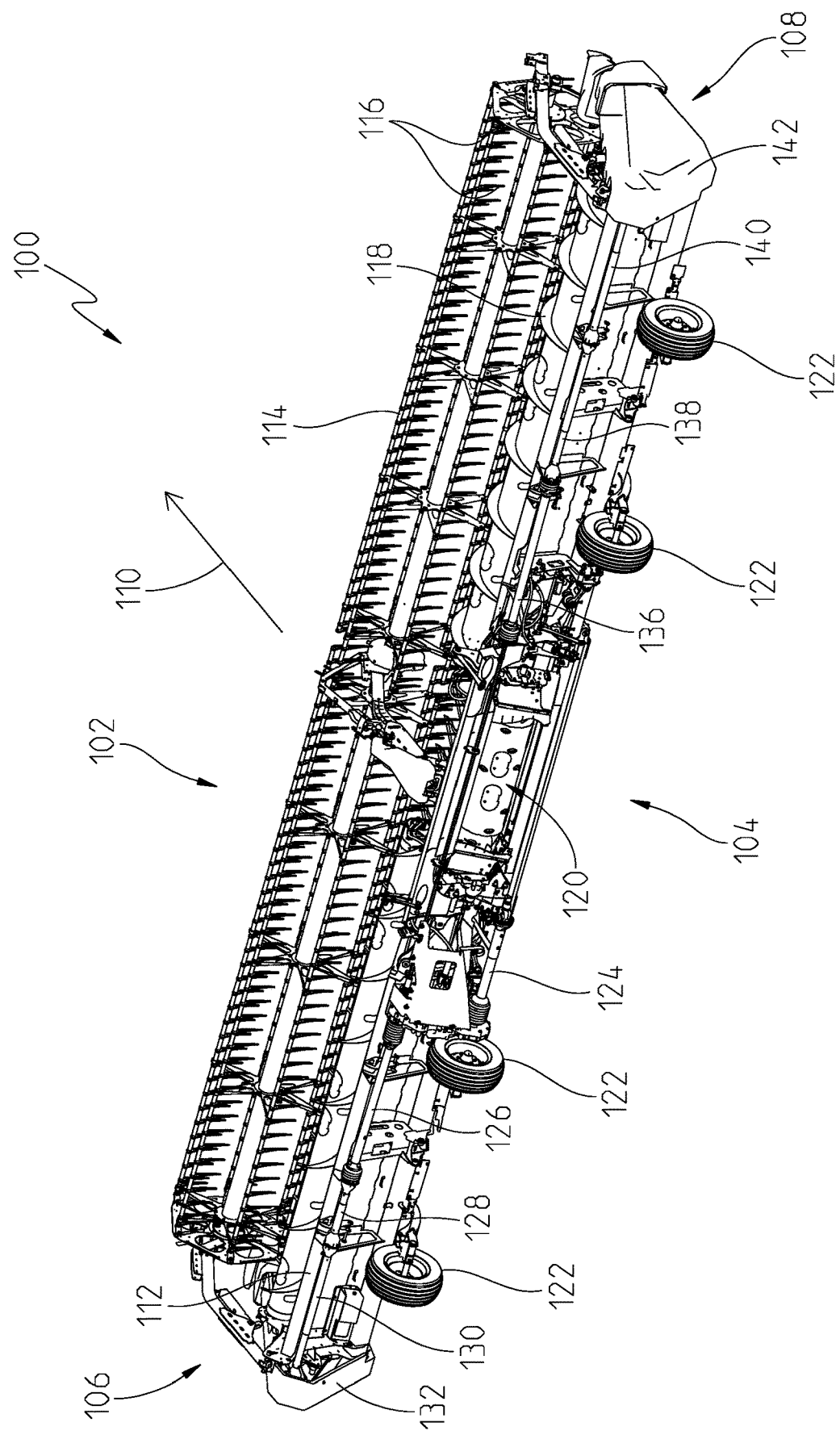
FIG. 1 is a rear perspective view of a draper head including one or more transfer shafts.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Work machines, particularly in the agricultural, construction and forestry industries (e.g., a combine) include one or more shafts for transferring power or torque throughout the machine to drive different components. A combine, for example, may include a corn head and draper head that uses a plurality of knives for cutting crop and other material. The plurality of knives may be reciprocally-driven by a sickle drive assembly at each end of a draper head. The power to drive the sickle drive assembly, however, may come from a main power unit (e.g., engine) located on the combine or near the feederhouse of the combine. Power is then transferred via one or more transfer shafts to the sickle drive assembly.

These transfer shafts, or referred to herein as shafts, may be exposed to the surrounding environment if not partially or entirely covered. In some aspects, a conventional, elongated cover may be disposed to protect each shaft from the surrounding environment. With a combine, for example, crop, dirt, dust, mud, debris, and other contaminants can be churned during operation. These substances can get wedged between bearings or other components which affect the functionality of the shafts. The cover is then situated to reduce the amount of debris and other contaminants that can get wedged or caught in the shaft, bearings, joints, etc.

Conventional shaft coverings were rigid, elongated covers that bolted or otherwise mechanically attached to a frame of the work machine via a metal plate, bracket or the like. The rigid covering may be formed of a plastic, aluminum, metal or other material. To perform service or remove the shaft, the conventional covering had to be removed first. The conventional covering, however, is difficult to remove and often requires multiple people to remove it. Space constraints make removing or installing fasteners difficult, and it is further time-consuming to remove the covering. Thus, there is a need for a quicker and easier manner for installing or removing a shaft covering or shielding from a work machine. Moreover, it is desirable to be able to install or remove the shielding by only a single individual. It is also desirable to be able to protect the shaft via the shielding from debris and other contaminants that otherwise may get wedged or caught in the shaft, bearings, joints, etc.

To achieve the foregoing, in one embodiment a pair of shielding tubes that are telescopically coupled to one another may be provided. The telescopic shielding tubes may be contracted to reduce the overall length of the shielding during an installation or removal, and then extended or expanded for being coupled to the work machine. The telescopic tubing may substantially enclose the shaft during operation to prevent dust, dirt, and other debris from affecting the rotational performance of the shaft, bearings, joints, etc. Moreover, the telescopic shielding tubes may protect an individual inspecting the work machine in the event the shafts are rotating at high speeds.

In another embodiment, shielding tubes may be coupled to one or more shield couplers in a quick-connect/quick-disconnect manner. In this way, the shielding tubes may be quickly coupled in an installed position or quickly removed in a disassembled position without the use of tools, bolts or other fasteners. Thus, the shielding used to protect a shaft and manner in which it is assembled/disassembled may reduce the overall cost of the components, the weight of the parts, the assembly/disassembly time, and service time compared to conventional shaft coverings.

For purposes of this disclosure, the term "quick-connect," "quick-disconnect", and "snap-fit" connection is used to describe a coupling between two separate components in a way that does not require the use of a tool or fastener (e.g., bolt, screw, etc.). There are many different ways to connect two components together in this way, and the present disclosure describes a few of these ways. However, the present disclosure is not intended to be limited to any specific manner in which two components can be coupled in a "quick-connect" or "snap-fit" connection. For example, one "quick-connect" connection may be simply snapping the two components together. In a second example, the "quick-connect" connection may be screwing two components together via threads—again, without the use of tools or fasteners. A user may be required to snap, twist, screw, latch or perform any other similar type of action to achieve a "quick-connect" connection for purposes of this disclosure.

For purposes of the present disclosure, the term "telescopic" refers to the manner in which two or more tubular sections move relative to one another. In one example, the tubular sections may slide in a telescopic manner relative to one another. In this way, one tubular section may comprise a diameter that is slightly greater than a diameter of the other tubular section. The diameters of the tubular sections may be any diameter, and the difference between the diameters of the tubular sections may be any difference that allows the tubular sections to move relative to one another in a telescopic manner.

Further, in one example of this disclosure, the tubular sections may be coupled to one another in only a telescopic manner such that the tubular sections may be disconnected from one another completely. In yet a further example, the tubular sections may be coupled to one another in a telescopic manner but also such that the tubular sections cannot be disconnected from one another completely. For instance, a ridge, fastener, wedge portion, or other means may be used to prevent the tubular sections from being completely disconnected from one another.

In one example, there may be only two tubular sections. In another example, there may be three tubular sections. In a further example, there may be four tubular sections. In yet a further example, there may be a plurality of tubular sections that have a telescopic relationship with one another. In other words, the present disclosure is not limited to the number of tubular sections that may be telescopically coupled to one another.

Referring to FIG. 1 of the present disclosure, a draper head 100 is illustrated. The draper 100 may be coupled to a feederhouse (not shown) of a combine (not shown) or other work machine. Although a draper head is shown, it is to be understood that the present disclosure is not limited to a draper head. When coupled to the feederhouse of a combine, the draper head 100 may travel in a forward travel direction indicated by arrow 110. The draper head 100 may also travel in other directions besides the travel direction 110.

The draper head 100 may include a front 102, a rear 104, a first side 106 and a second side 108. The draper head 100 may include a chassis or frame 112 which may be supported by a plurality of ground-engaging mechanisms such as wheels 122 or tracks. The draper head 100 may also include a reel or pickup mechanism 114 that includes a plurality of tines 116 for collecting crop or other material. An auger or rotatable drum 118 may span the width of the draper 100 for moving crop from a laterally outward location along the draper head 100 towards a central opening 120 which may be received by the feederhouse (not shown). Thus, as crop is cut by a plurality of knives or other cutting tools (not shown), the crop may be transferred laterally inwardly via the auger 118 to the opening 120 where the crop is transferred rearwardly into the feederhouse and processed further by the combine or other work machine. The plurality of knives or other cutting tools may be reciprocally driven by a first drive assembly 132 disposed on the first side 106 of the draper head 100 and by a second drive assembly 142 located on the second side 108 thereof.

In the embodiment of FIG. 1, the first drive assembly 132 and second drive assembly 142 may be operably driven by a main drive assembly (not shown). The main drive assembly may be an engine which powers the work machine, e.g., combine, or it may be separate therefrom. The main drive assembly may be a main gearbox which produces power. The power may be split as it is transferred laterally outwardly to the first and second drive assemblies 132, 142. To transfer the power, a plurality of transfer shafts may be provided. As shown, a first shaft assembly 124 may be operably coupled to the main drive assembly for transferring power to a second shaft assembly 126. The second shaft assembly 126 may further transfer the power laterally outwardly to a third shaft assembly 128, which in turn transfers the power to a fourth shaft assembly 130. The fourth shaft assembly 130 may be the laterally outermost shaft assembly such that its output is coupled to the first drive assembly 132. Likewise, a fifth shaft assembly 136 may be operably coupled to the main drive assembly for transferring power to a sixth shaft assembly 138. The sixth shaft assembly 138 may further transfer the power laterally outwardly to a seventh shaft assembly 140. The seventh shaft assembly 140 may be the laterally outermost shaft assembly on the second side 108 of the draper head 100 such that its output is coupled to the second drive assembly 142.

Figure 2:
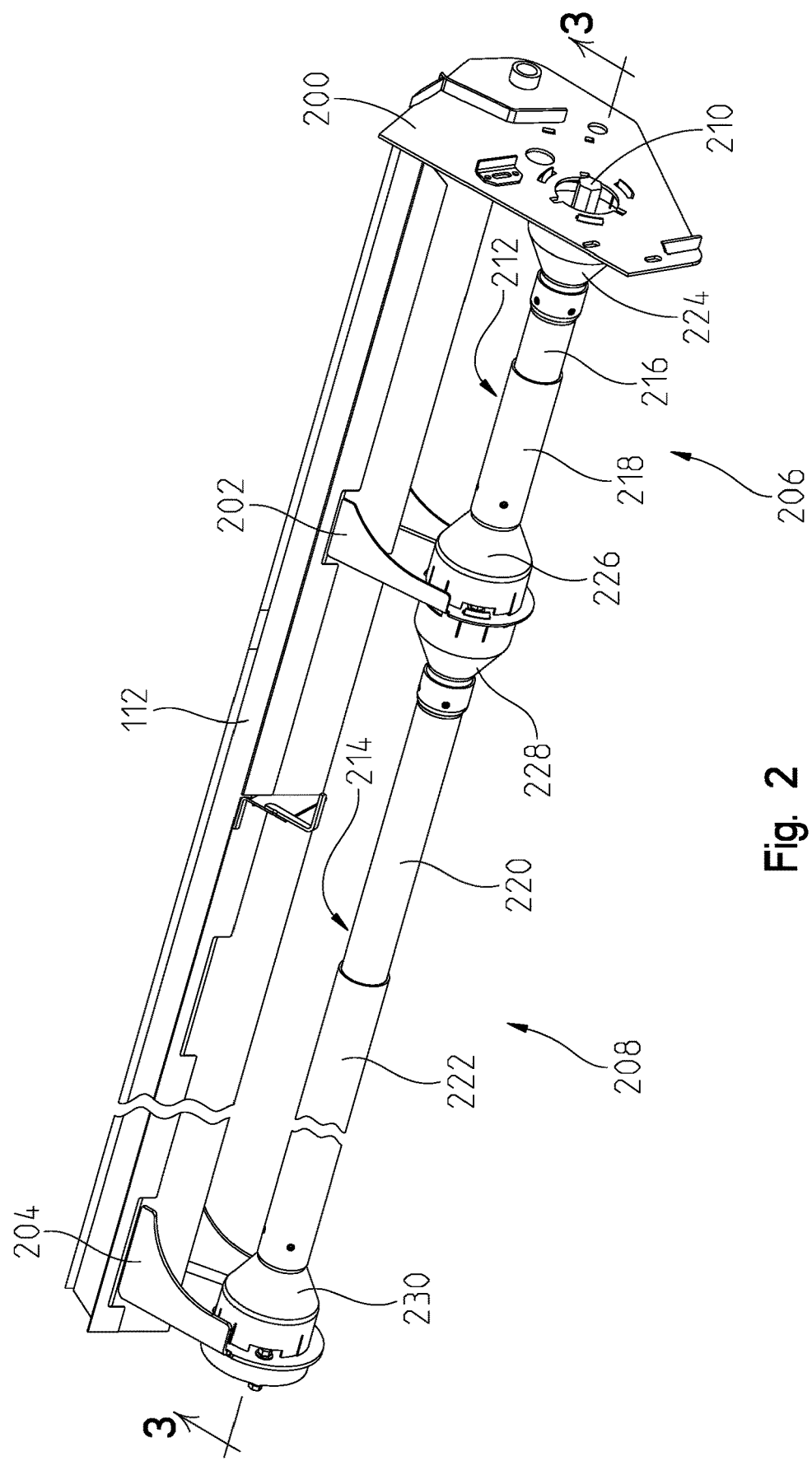
FIG. 2 is a partial perspective view of a pair of transfer shafts including telescopic shielding.

Referring to FIG. 2, a shaft and shielding assembly is shown. The assembly, which may be part of the draper head 100 of FIG. 1 but is not limited to such, may include an end bracket 200 coupled to a chassis or frame 112 of a work machine. The assembly may also include a first bracket 202 and a second bracket 204. The first bracket 202 and second bracket 204 may be coupled to the frame 112. Moreover, the first bracket 202 may be spaced by a first distance laterally from the end bracket 200, and the second bracket 204 may be spaced by a second distance laterally from the first bracket 202. The first distance and second distance may be equal in one embodiment. In another embodiment, the first distance may be less than the second distance. In a further embodiment, the first distance may be greater than the second distance.

The assembly may further include a first shaft assembly 206 disposed between the first bracket 202 and the end bracket 200, and a second shaft assembly 208 disposed between the first bracket 202 and the second bracket 204. The first shaft assembly 206 may include a first shaft 210 that is rotatable about a first rotational axis. The second shaft assembly 208 may include a second shaft 300 (FIG. 3) that is rotatable about a second rotational axis. The first rotational axis and the second rotational axis may be coaxial with one another. In an alternative embodiment, the first rotational axis may not be coaxial with the second rotational axis.

Figure 3:
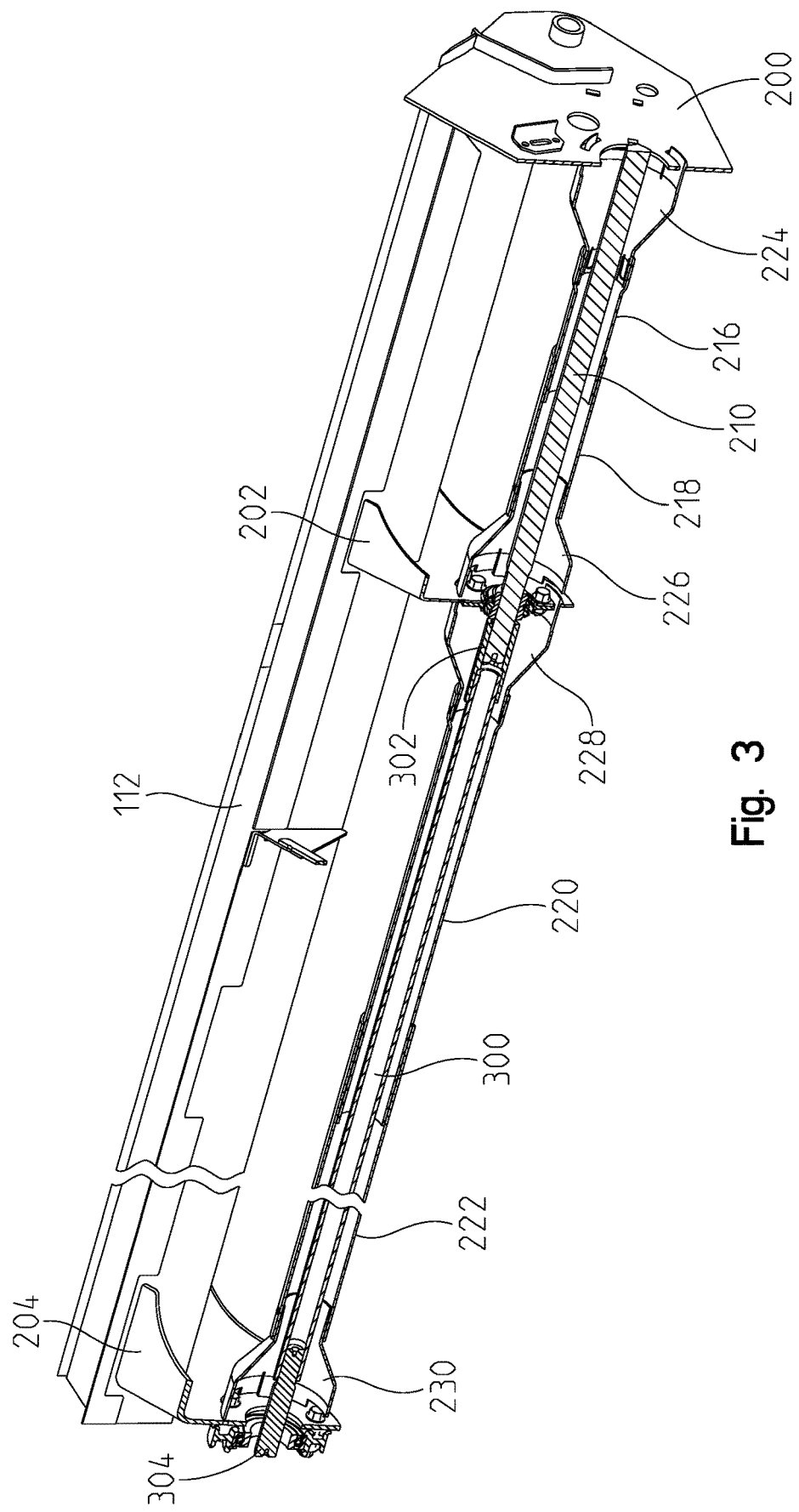
FIG. 3 is a partial cross-sectional view of the transfer shafts and shielding of FIG. 2.

As shown in FIG. 3, an intermediate shaft coupler or sleeve 302 may be coupled between the first and second shafts to help transfer torque therebetween. Although not shown, the first shaft 210 and second shaft 300 may include external splines. The intermediate coupler or sleeve 302 may include internal splines that mate or couple to the external splines of the first and second shafts to help with the torque transfer.

At an opposite end of the second shaft 300, a second shaft coupler 304 may be rotationally coupled to the second shaft 300. Here, the second shaft 300 may have a portion of its length at this end which is partially hollow and includes internal splines. The second shaft coupler 304 may include external splines for mating or coupling with the internal splines of the second shaft. In the present disclosure, the manner in which torque is transferred between shafts may be by any conventional means known to the skilled artisan. Moreover, the one or more shafts described herein may be solid shafts, partially hollow shafts, or hollow shafts. In other words, the present disclosure is not limited to any type of shaft. In some instances, it is known to have an orifice or channel defined in a shaft to allow lubricating oil or fluid to flow therethrough for lubrication reasons.

In FIG. 2, the first shaft assembly 206 may include a first shielding assembly 212 formed by a first tubular section 216 and a second tubular section 218. The first and second tubular sections may be telescopically coupled to one another so that the first shielding assembly 212 can be accommodated to the length of the first distance. For instance, the first tubular section 216 may have a smaller diameter than the second tubular section 218 to allow for the two tubular sections to contract or extend relative to one another in a telescopic manner. As such, the length of the first shielding assembly 212 may be adjusted based on the distance between the end bracket 200 and the first bracket 202.

The first shielding assembly 212 may be coupled to a first shield coupler 224 and a second shield coupler 226. The first shield coupler 224, for example, may be coupled to the end bracket 200, and the second shield coupler 226 may be coupled to the first bracket 202. The first tubular section 216 may be removably coupled to the first shield coupler 224, and the second tubular section 218 may be removably coupled to the second shield coupler 226.

As shown in FIG. 3, the first shaft 210 may be shielded from the surrounding environment by the first shielding assembly 212, the first shield coupler 224 and the second shield coupler 226. In FIG. 3, the shaft 210 is completely surrounded by the first shielding assembly 212, the first shield coupler 224 and the second shield coupler 226. In another embodiment, the first shaft 210 may only be partially surrounded or shielded by the first shielding assembly 212, the first shield coupler 224 and the second shield coupler 226.

The first shaft assembly 206 and the second shaft assembly 208 may also include bearings, washers, and the like to support the rotation of the shaft 210. These features are not shown in detail in FIG. 2 or 3, but any conventional bearing, washer, etc. may be incorporated into the design. As a result, the first shielding assembly 212 and the shield couplers may at least partially shield or cover the bearings, washers, etc. from the surrounding environment.

In FIG. 2, the second shaft assembly 208 may include a second shielding assembly 214 formed by a first tubular section 220 and a second tubular section 222. The first and second tubular sections may be telescopically coupled to one another so that the second shielding assembly 214 can be accommodated to the length of the second distance between the first bracket 202 and the second bracket 204. For instance, the first tubular section 220 may have a smaller diameter than the second tubular section 222 to allow for the two tubular sections to contract or extend relative to one another in a telescopic manner. As such, the length of the second shielding assembly 214 may be adjusted based on the distance between the first bracket 202 and the second bracket 204. In a different embodiment, the diameter of the second tubular section 222 may be smaller than the first tubular section 220.

The second shielding assembly 214 may also be coupled to a third shield coupler 228 and a fourth shield coupler 230. The third shield coupler 228, for example, may be coupled to the first bracket 202, and the fourth shield coupler 230 may be coupled to the second bracket 204. The first tubular section 220 may be removably coupled to the third shield coupler 228, and the second tubular section 218 may be removably coupled to the fourth shield coupler 230. Like the first shielding assembly 212, the second shielding assembly 214 and the shield couplers 228, 230 may at least partially shield or cover the bearings, washers, etc. of the second shaft assembly 208 from the surrounding environment.

Figure 4:
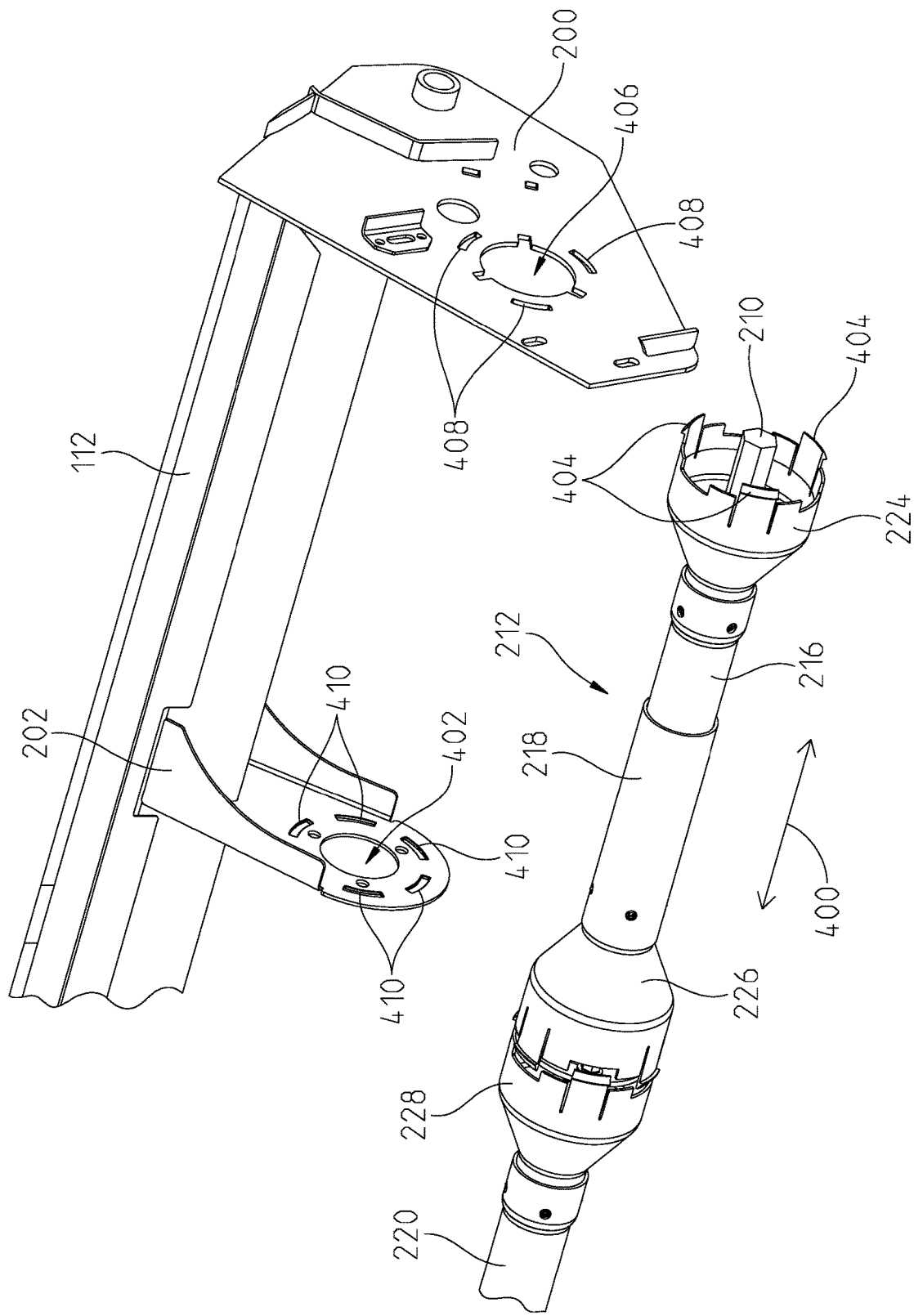
FIG. 4 is a partial perspective view of the transfer shafts and shielding of FIG. 2.
Figure 5:
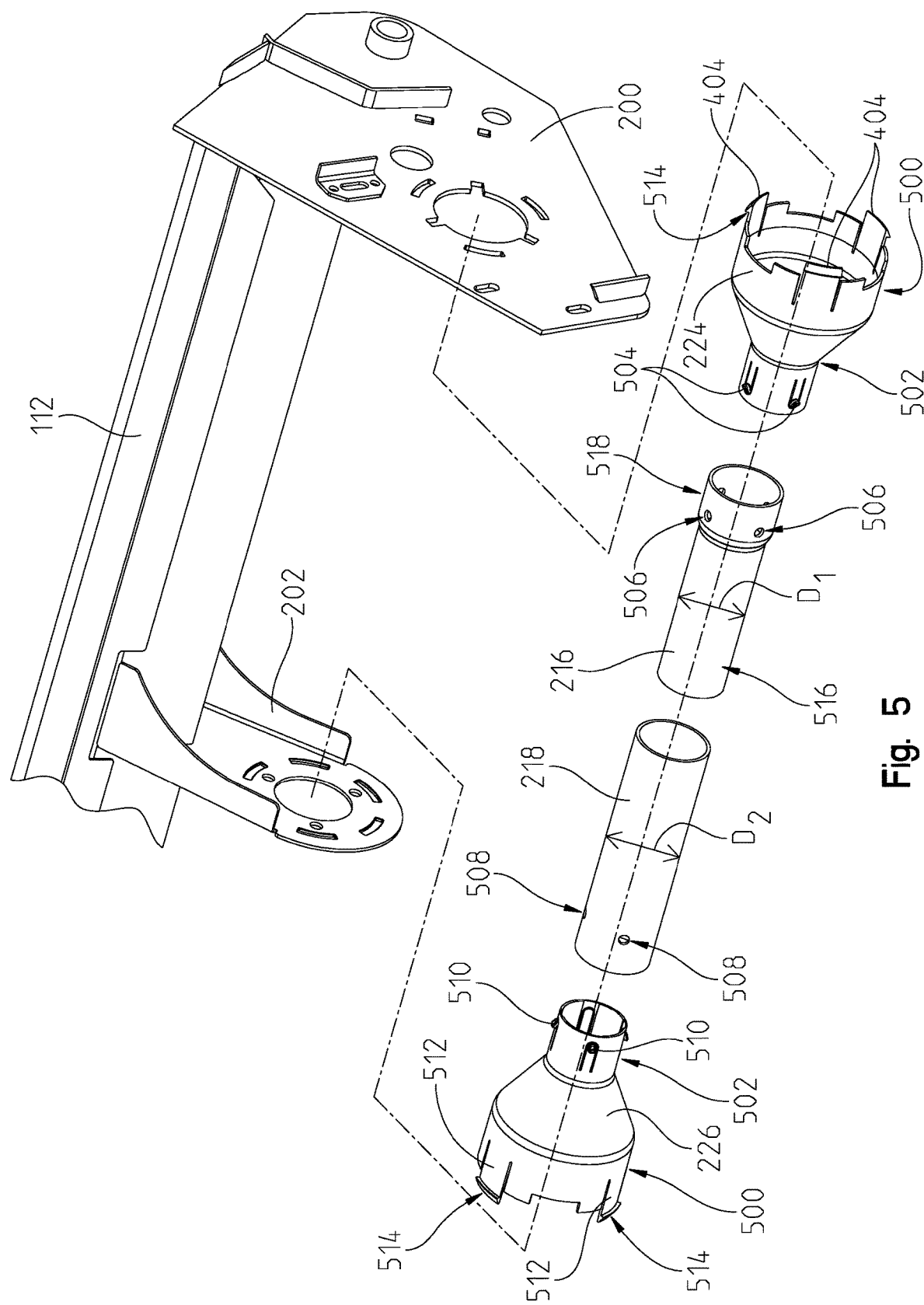
FIG. 5 is a partial exploded and perspective view of the shielding of FIG. 2.

Referring to FIGS. 4 and 5, the first shaft assembly 206 and first shielding assembly 212 will be described in further detail. It is to be understood, however, that the forthcoming description of these assemblies may apply to other assemblies including, but not limited to, the second shaft assembly 208 and second shielding assembly 214. As shown, the first tubular section 216 and the second tubular section 218 are capable of being telescopically moved relative to one another in a telescopic direction indicated by arrow 400. This allows the first shielding assembly 212 to be adjusted to different lengths of shafts 210. Moreover, it also allows the shaft 210 and first shielding assembly 212 to be installed more quickly and easier than conventional shaft coverings.

In FIG. 4, the first bracket 202 may be coupled to the frame 112 of the work machine, for example. The first bracket 202 may include a shaft opening 402 defined therein to allow a portion of the first shaft 210 to be disposed therethrough. Moreover, the first shaft coupler 302 may also be disposed partially through the shaft opening 402. The first bracket 202 may also include a plurality of slots 410 formed therein. Each of the plurality of slots 410 may be radially spaced from an adjacent slot 410. In FIG. 4, a total of six slots 410 are shown in the first bracket 202, but the present disclosure is not limited to any number of slots 410. Moreover, each of the plurality of slots 410 may be radially spaced equidistantly from adjacent slots 410. Alternatively, each of the plurality of slots 410 may not be radially spaced equidistantly from adjacent slots 410.

The end bracket 200 may also define a shaft opening 406 for receiving an end of the first shaft 210. Further, a portion of the main drive assembly or main gearbox may be disposed through the opening 406. Similar to the first bracket 202, the end bracket 200 may also include a plurality of slots 408 formed therein. Each of the plurality of slots 408 may be radially spaced equidistantly from an adjacent slot 408. Alternatively, each of the plurality of slots 408 may not be radially spaced equidistantly from adjacent slots 408.

The first shield coupler 224 may include a first end that is coupled to the first tubular section 216 and a second end for coupling to the end bracket 200. To do so, the first shield coupler 224 may include one or more tabs 404 with a retaining clip at the end thereof for being received in one of the plurality of slots 408 defined in the end bracket 200. The retaining clip may be forced through one of the slots 408 until it couples thereto. In this manner, each of the one or more tabs 404 may be quickly connected in a snap-fit-like manner to the end bracket 200. This type of connection is desirable due to the lack of tools or fasteners required to assemble or disassemble the shield coupler 224 from the end bracket 200.

Referring to FIG. 5, the same type of quick-fit or snap-fit connection is possible between the second shield coupler 226 and the first bracket 202. For example, the second shield coupler 226 may include one or more tabs 512 with a retaining clip or lip 514 at the end thereof for being received in one of the plurality of slots 410 defined in the first bracket 202. The retaining clip or lip 514 may be forced through one of the slots 410 until it couples thereto. In this manner, each of the one or more tabs 512 may be quickly connected in a snap-fit-like manner to the first bracket 202. This type of connection is desirable due to the lack of tools or fasteners required to assemble or disassemble the second shield coupler 226 from the first bracket 202.

The first and second shield couplers 224, 226 may be formed of a plastic material via an injection molding process. Alternatively, the couplers may be formed of plastic by another known process. Further yet, the couplers may be formed of a different material including aluminum, titanium, steel, or other metallic material.

The shield couplers may include a cone-like or funnel-like shape as shown in FIG. 5. For instance, the second shield coupler 226 may include a narrow portion 502 for coupling to the second tubular section 218. A larger portion 500 is integrally coupled with the narrow portion 502 via the funnel-like section. Along the narrow portion 502, and spaced radially about on the exterior surface thereof, the second shield coupler 226 may include one or more tabs or buttons 510. These tabs or buttons 510 may be received in one or more apertures 508 formed in the second tubular section 218. The tabs or buttons 510 may be aligned with the one or more apertures 508 such that the second tubular portion 218 may be slid into contact with the second shield coupler 226 until the tabs or buttons 510 are disposed in the corresponding apertures 508 formed in the second tubular section 218. In this manner, the second tubular section 218 may be easily and quickly connected in a quick-connect or snap-fit connection with the second shield coupler 226 without the use of any tools or fasteners.

In the same way, the first shield coupler 224 may also include a larger diametrical portion 500 and a narrower or smaller diametrical portion 502 coupled to one another via a funnel-like portion. One or more tabs or buttons 504 may be formed on the outer surface of the smaller portion 502, and these tabs or buttons 504 may be received in a corresponding aperture 506 formed in the first tubular section 216. In the embodiment of FIG. 5, the first tubular section 216 is shown having a small diameter portion 516 and a large diameter portion 518. The apertures 506 may be formed in the large diameter portion 518, as shown. Thus, the first tubular section 216 may be easily and quickly connected in a quick-connect or snap-fit connection with the first shield coupler 224 without the use of any tools or fasteners.

During assembly, the first shaft 210 may be located within the first shielding assembly 212. The first tubular section 216 and second tubular section 218 may be telescopically retracted with respect to one another to enable the first shielding assembly 212 to be coupled to the respective first and second shield couplers. The first shield coupler 224 may be coupled to the end bracket 200 by aligning the one or more tabs 404 with the one or more slots 408, and the first shield coupler 224 may be pressed into a quick-connect or snap-fit connection with the end bracket 200 when the retaining clip or lip of the tabs 404 is coupled to the end bracket 200.

Similarly, the second shield coupler 226 may be coupled to the first bracket 202 by aligning the one or more tabs 512 with the one or more slots 410, and the second shield coupler 226 may be pressed into a quick-connect or snap-fit connection with the first bracket 202 when the retaining clip or lip 514 of the tabs 512 is coupled to the first bracket 202. Once the first and second shield couplers are coupled to the respective end bracket 200 and first bracket 202, the first shaft 210 may be disposed within the opening 402 in the first bracket 200 and the opening 406 in the end bracket 200. This may involve coupling the first shaft 210 to the main gearbox or drive assembly in accordance with any conventional manner. Moreover, the first shaft 210 may be coupled to the first shaft coupler 302 as shown in FIG. 3 and described above.

Once the shaft 210 is coupled between the first bracket 202 and the end bracket 200, the first shielding assembly 212 may be extended from its contracted (or collapsed or retracted) position telescopically as the first tubular section 216 may be coupled to the first shield coupler 224 and the second tubular section 218 is coupled to the second shield coupler 226, as described above. This may be achieved by a single person, without the use of any tools or fasteners, and the connection may be done quickly and easily via a quick-connect or snap-fit connection process.

The end bracket 200, first bracket 202, and second bracket 204 may be formed of a steel or other metallic material. The brackets may be rigid and coupled to the frame 112 via one or more fasteners (not shown). Alternatively, the brackets may be welded or connected to the frame via another means. The present disclosure is not limited to how the bracket or brackets are coupled to the frame or chassis. Moreover, as the present disclosure is not exclusively related to a bracket, any plate or other component may be used as a substitute for the brackets described herein.

The shielding assemblies, and more particularly, the tubular sections that make up each shielding assembly, may be formed of a plastic material such as, but not limited to, acrylonitrile butadiene styrene (ABS). In this example, the tubular section may be formed by an extrusion process. Alternatively, the tubular sections may be formed of aluminum or other metal. The tubular sections may be hollow to allow the shaft to pass therethrough. The diameter of each tubular section may be designed to accommodate a certain diameter shaft. Moreover, as shown in FIG. 5, one of the tubular sections may have a smaller diameter, $D_1$, and another of the tubular sections may have a larger diameter, $D_2$. Where there is a third tubular section that forms the shielding assembly, the third tubular section has a diameter that is different from the diameter of at least one of the other two tubular sections.

In one embodiment, the first and second tubular sections may be configured as hollow from one end to the opposite end. As such, the smaller diameter tubular section may slide in from one end and out the opposite end if there is no means for preventing this from happening. In another embodiment, the larger diameter tubular section may have one end of which has a tapered diameter in which the diameter gradually becomes smaller towards the end thereof. In this embodiment, the smaller tubular section may have a diameter that is greater than the tapered diameter of the larger tubular section to prevent the smaller tubular section from being installed or removed from that end. A flange or other means may be used to prevent the smaller tubular section from being installed or removed from one end of the larger tubular section. In this configuration, the tubular sections may be coupled at only a single end of the larger tubular section.

The length of one tubular section may be different from another tubular section. Alternatively, each tubular section may be the same length. Moreover, the inner diameter of each tubular section is at least large enough for a shaft to pass therethrough.

In a further configuration, a shield assembly may include at least three tubular sections. In one example of this configuration, each of the at least three tubular sections has a different diameter. In a different example, two of the tubular section may include the same diameter and the third of the at least three tubular sections may have a different diameter. In yet a further configuration, there may be four or more tubular sections. Each of the four or more tubular sections may have a different diameter from the other sections, or alternatively at least one of the tubular sections is different from the at least other three tubular sections.

Although not shown, it is also possible that the tubular sections can include splines that mate with one another as the tubular sections are telescopically coupled to one another. Other known arrangements for coupling two shafts to one another is possible.

Figure 6:
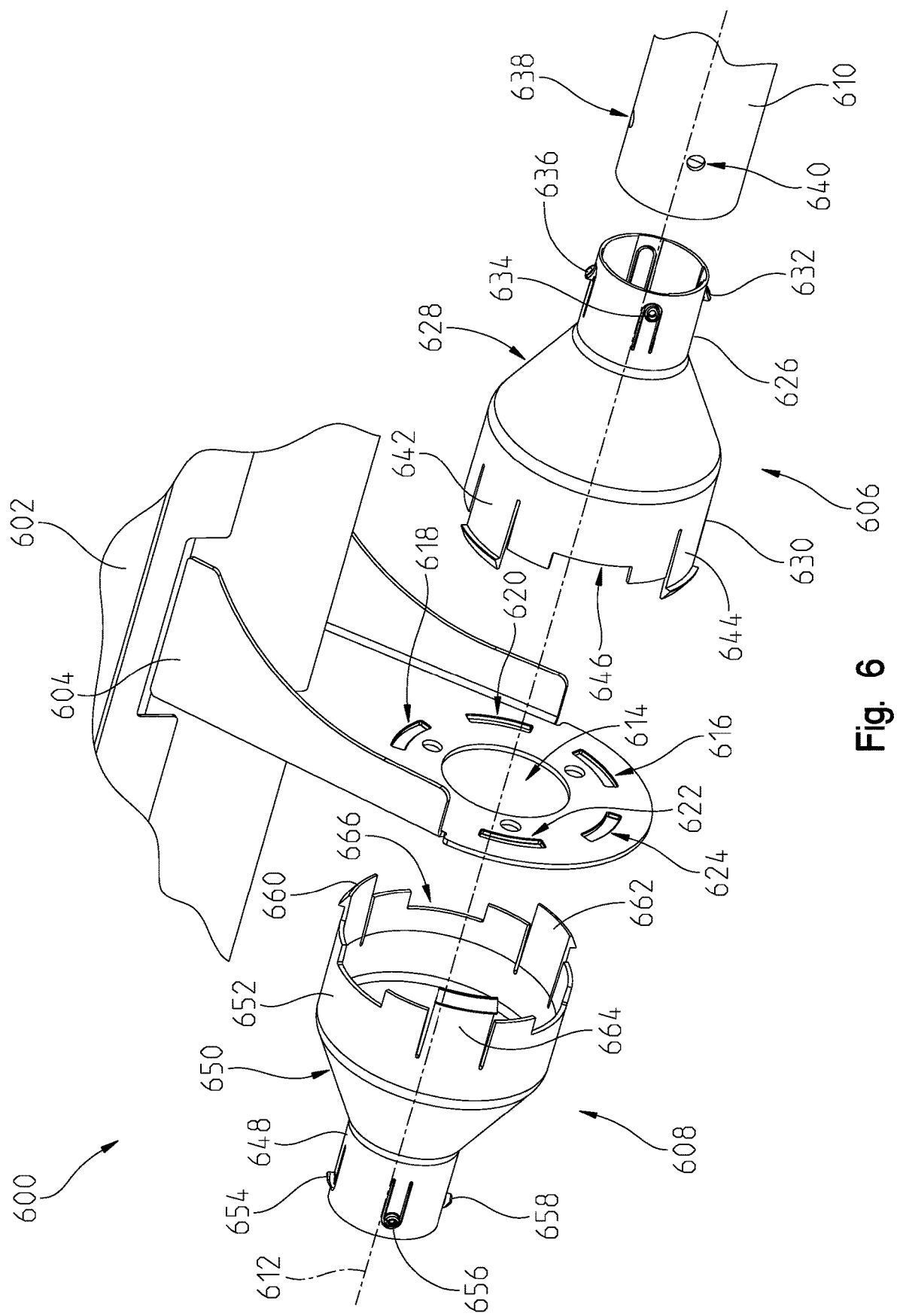
FIG. 6 is an exploded and perspective view of shaft shielding.

Turning now to FIG. 6, another embodiment of the present disclosure related to the shielding of a shaft used to transfer power is provided. In particular, a shaft and shielding assembly 600 is illustrated. The assembly 600 may be incorporated with a work machine as described above. Alternatively, it may be incorporated with another body that includes a frame or chassis 602 to which the shaft and shielding assembly 600 is coupled. A bracket 604 may be coupled to the frame 602 in a manner similar to the first bracket 202 and second bracket 204 of FIG. 2. The bracket 604 may be formed of steel or other metallic material, and it may include a shaft opening 614 formed therein. Moreover, the bracket 604 may include a plurality of slots formed therein. For instance, in FIG. 6, the plurality of slots may include a first slot 616, a second slot 618, a third slot 620, a fourth slot 622, and a fifth slot 624. Although not shown, a sixth slot may also be formed in the bracket 604. In addition, it is possible more slots may be formed as necessary.

The assembly 600 of FIG. 6 may also include a first shield coupler 606 and a second shield coupler 608. A tubular section 610 of a shield assembly is also shown, and the tubular section 610 may be removably coupled to the first shield coupler 606. For instance, the first shield coupler 606 is shown including a plurality of tabs or buttons including a first tab 632, a second tab 634, and a third tab 636 formed on its outer surface. The tubular section 610 may include a first aperture 638 and a second aperture 640 formed therein. The first tab 634 and second tab 636 may be formed in the outer surface of a first portion 626 of the shield coupler 606. The tubular section 610 may also include a third aperture (not shown) for receiving the first tab 632.

The first portion 626 may have a diameter that is smaller than the diameter of the tubular section 610, which allows the first portion 626 to slide internally within the tubular section 610. As it does, the second tab 636 may be aligned with and coupled to the first aperture 638, and the first tab 634 may be aligned with and coupled to the second aperture 640.

The first shield coupler 606 may have a substantially cone-shaped, funnel-shaped, or frustoconical design. This design includes the first portion 626 which has a small diameter for coupling with the tubular section 610. The overall design may also include a funnel portion 628 which transitions from the first portion 626 to a larger diameter second portion 630. The second shield coupler 608 may include a similar shape as the first shield coupler 606. For example, the second shield coupler may include a first portion 648 having a smaller diameter, a second larger diameter portion 652, and a funnel portion 650 integrally formed therebetween.

The first shield coupler 606 may also include a plurality of tabs formed with the second larger portion 630 for coupling to the bracket 604. In particular, as shown in FIG. 6, the plurality of tabs may include a first tab 642, a second tab 644 and a third tab (not shown). Additional tabs may be provided, and alternatively, only the two illustrated tabs may be provided. As also shown, a gap or space 646 is formed in the end of the first shield coupler 606 between the first tab 642 and the second tab 644. A similar space may be formed between the first tab 642 and the third tab, and another space between the second tab 644 and the third tab. Each tab may be radially spaced relative to one another about the first shield coupler 606, and as such, each space or gap may be radially formed relative to one another as well.

During assembly, the first tab 642, second tab 644, and third tab may be aligned with one of the slots formed in the bracket 604. For instance, the second tab 644 may be coupled with the fifth slot 624 and the third tab may be coupled with the third slot 620. The first tab 642 may be coupled with another slot which is not shown in FIG. 6.

Figure 7:
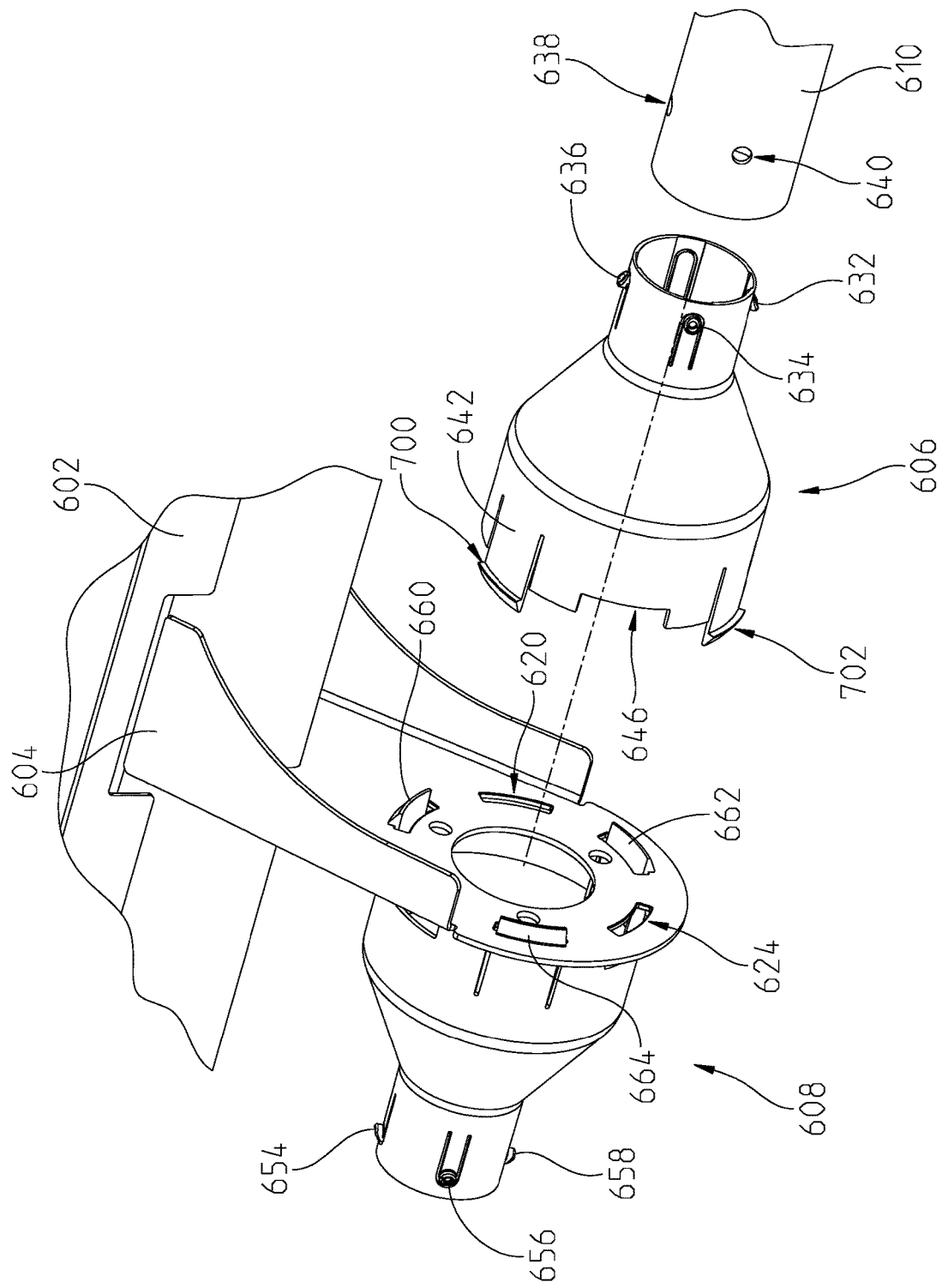
FIG. 7 is another exploded and perspective view of the shaft shielding of FIG. 6.

As shown in FIG. 6, each tab may include a retaining portion formed as a latch, clip, lip or the like. Each tab and its retaining portion may be flexible such that it can bend like a diving board relative to the second portion 630, and yet each tab is sufficiently rigid to remain engaged with the slots in the bracket 604 during installation. In FIG. 7, the first tab 642 is shown including a first retaining portion 700 and the second tab 644 is shown including a second retaining portion 702. As the first shield coupler 606 is moved into engagement with the slots formed in the bracket 604, the plurality of tabs may be aligned with the corresponding slot and deflect inwardly as the retaining portion is slid into engagement with the corresponding slot. Once assembled, the retaining portion is engaged with the slot to prevent the first shield coupler 606 from sliding out of engagement with the respective slots formed in the bracket 604.

The second shield coupler 608 may be designed similar to the first shield coupler 606, as described above. In particular, the second shield coupler 608 may couple to a tubular section of another shield assembly (not shown). To do so, the second shield coupler 608 may include a plurality of tabs or buttons formed on the outer surface of its first portion 648. The plurality of tabs or buttons may include a first tab 654, a second tab 656, and a third tab 658. There may be additional tabs which are not shown in FIG. 6. Each tab may be slidably disposed into engagement with an aperture defined in the tubular section, which is not shown. The plurality of tabs are radially disposed relative to one another in a manner similar to that of the first shield coupler 606.

The second shield coupler 608 may also couple to the bracket 604 in a similar manner. The second shield coupler 608 may include a plurality of tabs including a first tab 660, a second tab 662, and a third tab 664. There may be additional tabs which are not shown in FIG. 6. Each of the plurality of tabs is spaced radially about the second portion 652 of the second shield coupler 608 as shown.

The second shield coupler 608 is also shown including a space or gap 666 formed inbetween two of the plurality of tabs. In FIG. 6, for example, the space 666 is formed between the first tab 660 and the second tab 662. The space 666 is aligned with the third slot 620 formed in the bracket 604. As such, when the first and second shield couplers are coupled to the bracket 604, the third tab (not shown) on the first shield coupler 606 is able to connect with the third slot 620 formed in the bracket 604 and extend therethrough into the space 666 formed by the second shield coupler 608.

This is perhaps best shown with respect to the space 646 formed in the first shield coupler 606. The first tab 660 of the second shield coupler may be aligned with and coupled to the second slot 620, the second tab 662 may be aligned with and coupled to the first slot 616, and the third tab 664 may be aligned with the coupled to the fourth slot 622. In each instance, the first tab 660, second tab 662, and third tab 664 protrudes through the corresponding slot and is positioned within a space similar to the space 646 formed in the first shield coupler 606. On the other hand, the first tab 642 of the first shield coupler 606 may be aligned with and coupled to a sixth aperture (not shown) in the bracket. The second tab 644 may be aligned with and coupled to the fifth slot 624 and a third tab (not shown) of the first shield coupler 606 may be aligned with and coupled to the third slot 620. The third tab (not shown) may extend through the third slot 620 and into the space 666 formed in the second shield coupler 608.

As a result, when the first and second shield couplers are coupled to the same bracket 604, the couplers are radially offset from one another to allow the tabs of each coupler to be aligned and engaged with a corresponding slot in the bracket. Further, each tab is able to protrude partially through the corresponding slot and be positioned within a space defined between a pair of tabs of the other shield coupler. This ensures that both couplers may be removably coupled to the same bracket, and due to the radial offset between couplers, there is less open space or gaps between the couplers for dirt, dust, and other debris from entering and causing issues with bearings, joints, or the shaft.

The plurality of tabs of the second shield coupler may include retaining portions similar to those shown in FIG. 7.

While the features for being coupled to the brackets are described as tabs, these may also be referred to as latches or clips capable of being coupled as a quick-connect or snap-fit connection. Moreover, the plurality of tabs or buttons described in this disclosure may be flexibly coupled to the respective shield coupler such that as the narrow portion of the coupler is inserted into the tubular section, the plurality of tabs or buttons may be deflected or pushed radially inwardly until each tab or button biases into a corresponding aperture.

In FIG. 6, a shaft (not shown) may be inserted into the tubular section 610 and coupled such that it is aligned along a shaft axis 612. In this embodiment, the shaft opening 614 is aligned with the shaft axis 612, as are the first and second shield couplers.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A shield assembly for a shaft, comprising:
   a first tubular section comprising a first body having a first end and a second end, the body defining a first hollow channel therethrough from the first end to the second end for receiving the shaft; and
   a second tubular section comprising a second body having a first end and a second end, the body defining a second hollow channel therethrough from the first end to the second end for receiving the shaft;
   a shield coupler for coupling to the first tubular section, the shield coupler including a larger portion including a plurality of tabs extending from a shield coupler end along a length of the shield coupler and, a space formed in the shield coupler end between two of the plurality of tabs, the space providing a location for receiving a tab of another shield coupler;
   wherein, the first tubular section comprises a first outer diameter and the second tubular section comprises a second outer diameter, the first outer diameter being greater than the second outer diameter;
   further wherein, the first tubular section and the second tubular section are telescopically coupled to one another where the second tubular section is movably disposed at least partially within the first tubular section.

2. The shield assembly of claim 1, wherein, the first tubular section and the second tubular section are telescopically coupled to one another to form a collapsed configuration and an extended configuration, the collapsed configuration comprising a smallest length of the shield assembly and the extended configuration comprising a largest length of the shield assembly.

3. The shield assembly of claim 1, further comprising a shaft disposed within the first and second hollow channels, the shaft comprising a shaft length;
   wherein, the first tubular section and second tubular section are adjustably and telescopically positioned relative to one another so that a length of the first and second tubular sections is approximately the same as the shaft length.

4. The shield assembly of claim 1, wherein the first tubular section and second tubular section are removably coupled to one another such that the second tubular section slides in from one end of the first tubular section and out an opposite end of the first tubular section.

5. The shield assembly of claim 1, wherein the first end of the second tubular section comprises a smaller diameter portion that is less than a larger diameter portion of a second outer diameter of the second end of the second tubular section.

6. The shield assembly of claim 1, wherein the shield coupler comprises a narrow portion including one or more tabs;
   wherein, the first tubular section comprises one or more apertures formed therein for receiving the one or more tabs on the narrow portion of the shield coupler in a quick-connect manner.

7. The shield assembly of claim 6, further comprising a shield coupler for coupling to the second tubular section, the shield coupler comprising a narrow portion including one or more tabs and a larger portion comprising one or more tabs;
   wherein, the second tubular section comprises one or more apertures formed therein for receiving the one or more tabs on the narrow portion of the shield coupler in a quick-connect manner.

\* \* \* \* \*